(12) United States Patent
Dorr

(10) Patent No.: US 8,810,087 B2
(45) Date of Patent: Aug. 19, 2014

(54) MOTOR UNIT

(75) Inventor: Gerhard Dorr, Allersberg (DE)

(73) Assignee: Siemens Aktiengesellschaft, München (DE)

( * ) Notice: Subject to any disclaimer, the term of this patent is extended or adjusted under 35 U.S.C. 154(b) by 115 days.

(21) Appl. No.: 13/579,831

(22) PCT Filed: Jan. 14, 2011

(86) PCT No.: PCT/EP2011/050434
§ 371 (c)(1),
(2), (4) Date: Sep. 11, 2012

(87) PCT Pub. No.: WO2011/101186
PCT Pub. Date: Aug. 25, 2011

(65) Prior Publication Data
US 2012/0326540 A1 Dec. 27, 2012

(30) Foreign Application Priority Data
Feb. 18, 2010 (DE) .......................... 10 2010 002 068

(51) Int. Cl.
*H02K 1/32* (2006.01)
(52) U.S. Cl.
USPC ............................................. 310/64; 310/59
(58) Field of Classification Search
USPC ........................ 310/52, 54, 58, 64, 59, 60 R IPC ............................... H02K 9/10,9/12, 9/14, 9/18
See application file for complete search history.

(56) References Cited

U.S. PATENT DOCUMENTS

| | | | |
|---|---|---|---|
| 6,201,365 B1 * | 3/2001 | Hara et al. ..................... | 318/558 |
| 7,102,260 B2 * | 9/2006 | Takenaka et al. ............... | 310/64 |
| 7,122,928 B2 * | 10/2006 | Shindo ........................... | 310/89 |
| 7,211,912 B2 * | 5/2007 | Takenaka et al. ............... | 310/54 |
| 7,462,963 B2 * | 12/2008 | Ishihara et al. ................. | 310/58 |
| 7,569,957 B2 * | 8/2009 | Aoki et al. ...................... | 310/64 |
| 2005/0253465 A1 * | 11/2005 | Takenaka et al. ............... | 310/52 |
| 2006/0113851 A1 * | 6/2006 | Ishihara et al. ................. | 310/52 |
| 2010/0013331 A1 | 1/2010 | Yutaka | |

FOREIGN PATENT DOCUMENTS

| | | |
|---|---|---|
| CN | 1738159 | 2/2006 |
| DE | 42 43 044 A1 | 7/1993 |
| DE | 195 11 114 C1 | 8/1996 |
| DE | 196 36 723 A1 | 3/1997 |
| DE | 197 03 655 C2 | 1/2000 |
| DE | 299 19 949 U1 | 1/2000 |
| GB | 2 214 722 A | 9/1989 |
| JP | 2008092727 | 4/2008 |

* cited by examiner

*Primary Examiner* — Hanh Nguyen
(74) *Attorney, Agent, or Firm* — Henry M Feiereisen LLC

(57) ABSTRACT

The invention relates to a motor unit (5) comprising a motor (1), a heat exchanger (2) and an inverter (3) for the motor (1). In order to provide a compact, low-cost motor unit it is proposed that the heat exchanger (2) is embodied for cooling both the motor (1) and the inverter (3).

4 Claims, 3 Drawing Sheets

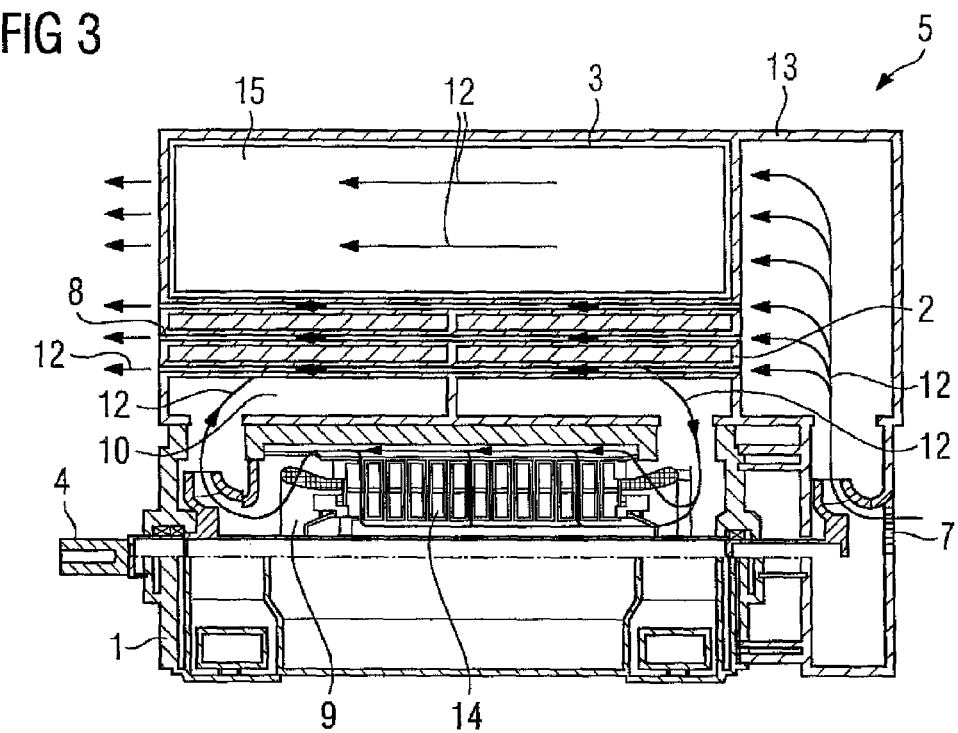
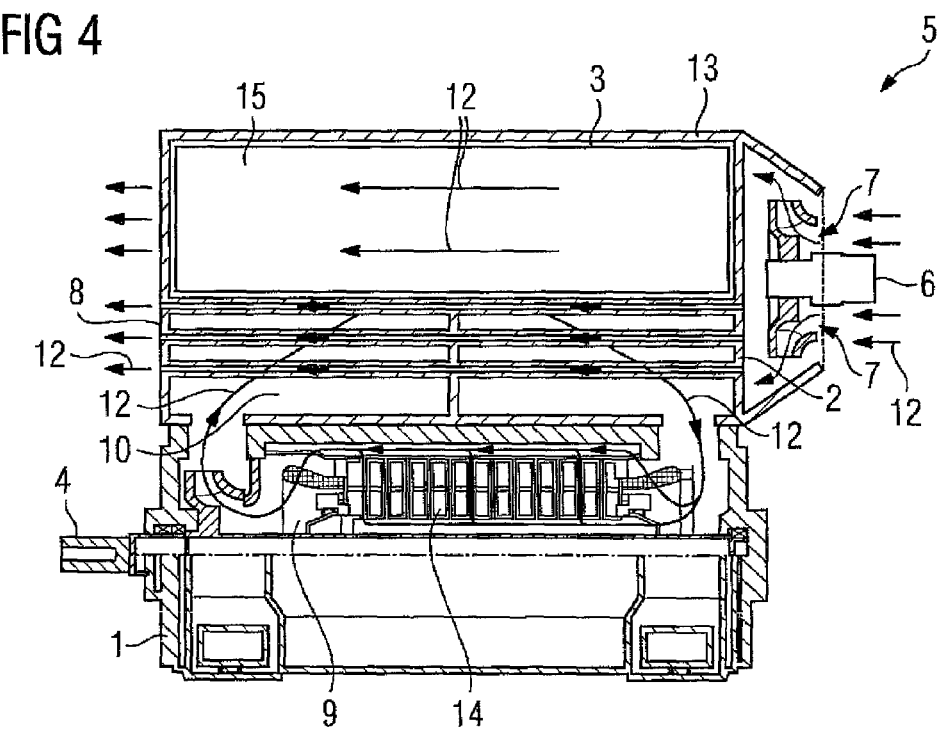

MOTOR UNIT

CROSS-REFERENCES TO RELATED APPLICATIONS

This application is the U.S. National Stage of International Application No. PCT/EP 2011/050434, filed Jan. 14, 2011, which designated the United States and has been published as International Publication No. WO 2011/101186 and which claims the priority of German Patent Application, Serial No. 10 2010 002 068.0, filed Feb.18, 2010, pursuant to 35 U.S.C. 119(a)-(d).

BACKGROUND OF THE INVENTION

The invention relates to a motor unit comprising a motor, a heat exchanger and an inverter for the motor.

Low-voltage motors are currently implemented mainly as fin-cooled machines. Machines of said type find application in power grid operation or at the inverter.

The inverter is in this instance mostly a cabinet device that is positioned as a stationary element at a greater or lesser distance upstream of the motor. In many cases very long cables are necessary from the inverter to the motor. These cases are subjected to loads in the form of very high voltage peaks due to reflections occurring in the cables. Voltage peaks of said type can lead for example to problems with the winding insulation as well as to problems with bearing currents.

It is furthermore known from high-voltage motors that a heat exchanger is mounted at the side of the motor. Improved cooling of the motor can be achieved by this means.

SUMMARY OF THE INVENTION

It is the object of the present invention to provide a compact, low-cost motor unit.

This object is achieved according to the invention by a motor unit comprising a motor, a heat exchanger and an inverter for the motor, wherein the heat exchanger is embodied to cool both the motor and the inverter.

Because both the motor and the inverter are cooled by means of only a single heat exchanger there is no need for a separate means of cooling the inverter or motor that would otherwise be necessary. In particular the inverter, which preferably comprises a control unit and a power module, can be cooled in addition by being appropriately arranged in or integrated into a heat exchanger provided for the motor.

The motor, the heat exchanger and the inverter consequently form a compact motor unit which can already be fully wired and parameterized in the course of its manufacture. An advantage resulting in this case consists in the fact that the motor together with the heat exchanger and the inverter can be fully tested following production and does not need, as is customarily the case, to be cabled and tested only after delivery to the customer. The cabling of the inverter to the motor that is required to be carried out by a qualified professional is dispensed with entirely for the end customer. Another advantage is that the end customer can be provided with a compact, self-coordinated motor unit and as a result the end customer can be guaranteed optimal operation as well as optimal cooling of the motor and of the inverter.

Owing to the integration of the inverter with the motor it is also possible for decentralized speed control to be realized on the part of the customer.

By means of a motor unit of said type a customer can be provided with an optimally configured motor unit and the customer can be relieved of the labor-intensive and time-consuming cabling work required for the inverter and the motor. An end user can furthermore achieve a space saving thanks to the compact motor unit, because there is no need to provide a separate space for the inverter and its cooling system. An extremely compact motor unit can be provided as a result of the parallel cooling of the motor and the inverter by means of the heat exchanger.

In an advantageous embodiment variant of the invention the heat exchanger is arranged between the motor and the inverter and is connected to the motor and the inverter.

By arranging the heat exchanger between the motor and the inverter it is possible to ensure optimal cooling of the motor and of the inverter. In this arrangement the heat exchanger is preferably coupled to the motor and the inverter directly so that the most efficient heat transfer possible can take place between the motor and the heat exchanger as well as between the inverter and the heat exchanger.

In a further advantageous embodiment variant of the invention the inverter is incorporated within the housing of the heat exchanger.

Consequently the housing of the heat exchanger is connected directly to the housing of the motor. By integrating the inverter in the housing of the heat exchanger it is possible in particular to realize a space-saving design.

In another advantageous embodiment variant of the invention the heat exchanger includes a first opening to allow an inflow of a cooling medium into the interior of the heat exchanger and a second opening to allow the cooling medium to flow out from the interior of the heat exchanger.

In this case the cooling medium can be in gaseous, liquid or, assuming a phase transition takes place, gaseous/liquid form. With a liquid cooling medium, e.g. a water-cooled system, the cooling effected by the heat exchanger is preferably accomplished by means of an inserted water register. Equally it is conceivable for the heat exchanger to be realized on the basis of an open-circuit air cooling system in IP23 by means of corresponding cooling attachments.

The cooling medium of the heat exchanger is conducted into the interior of the heat exchanger by way of the first opening and out of the heat exchanger by way of the second opening. The cooling medium is consequently conducted through the heat exchanger such that a cooling process takes place inside the heat exchanger. Preferably the entire interior of the heat exchanger is cooled during this process.

Except for the first and second opening, the heat exchanger preferably forms a self-contained closed unit for the cooling medium, such that the cooling medium can enter and exit the motor unit only by way of the first and second opening, respectively. In this case an opening can be embodied for example by means of a grid structure of the housing.

Optimal cooling of the motor unit can be ensured by means of the heat exchanger. The inverter is preferably connected to the heat exchanger in such a way that heat-generating components on the inverter side are ideally directly adjacent to the heat exchanger. The heat exchanger should also be placed in contact with the heat-critical points of the motor.

In a further advantageous embodiment of the invention the cooling medium is gaseous.

In this case the heat exchanger is preferably implemented based on air cooling. Preferably the heat exchanger has a blower fan so that an airflow through the interior of the heat exchanger can be generated in a targeted manner. The cooling capacity of the heat exchanger can also be regulated by way of the blower fan. Selective control of the heat exchanger in terms of the present utilization of motor capacity can therefore be realized. The inverter requiring to be cooled can likewise be dealt with in a targeted manner.

In another advantageous embodiment variant of the invention the motor and the heat exchanger are embodied in such a way that portions of the cooling medium are conducted not only directly through the interior of the heat exchanger but also partly through the interior of the motor by way of the heat exchanger.

One portion of the cooling medium is consequently conducted directly through the interior of the heat exchanger to the second opening, while another portion is conducted partly into the interior of the housing of the motor by way of the interior of the heat exchanger. The cooling medium is conducted in the interior of the housing of the motor preferably so as to target the heat-producing points, such that an optimal cooling effect can be achieved.

Because some of the cooling medium is conducted through the interior of the motor, the shaft blower fan of the motor can be used to convey the cooling medium. In this way a flow is automatically created inside the heat exchanger, thereby enabling a saving to be made in respect of a separate ventilator for the heat exchanger. The cooling medium, which accordingly reaches the interior of the motor, can therefore ensure optimal cooling of the motor.

In a further advantageous embodiment variant of the invention the inverter is embodied in such a way and arranged with respect to the heat exchanger in such a way that a portion of a cooling medium is conducted through the inverter.

The inverter is consequently arranged either directly in the heat exchanger or on the heat exchanger in such a way that a portion of a cooling medium is conducted through the inverter. The inverter is in this case preferably embodied in such a way that a portion of the cooling medium flows almost completely through the inverter. The inverter has corresponding openings so that the cooling medium can flow through it.

An extremely compact design as well as extremely efficient cooling can be achieved as a result.

In another advantageous embodiment variant of the invention the heat exchanger comprises an air-to-water heat exchanger.

Extremely effective cooling of the motor unit can be achieved by this means and consequently an extremely compact motor unit can be realized. The cooling circuit for the air-to-water heat exchanger can be implemented both inside the motor unit and outside the motor unit.

Cooling the motor unit by means of an air-to-water heat exchanger furthermore enables the heat exchanger to be incorporated within a closed housing and as a result the safety of the motor unit can be increased. However, it is also possible for the housing, in particular the housing of the heat exchanger, to have openings so that additional cooling by means of air can be realized.

In this case the motor of the motor unit is preferably a low-voltage motor. The motor unit according to the invention makes it possible for the wiring between motor and inverter to be completed already at the factory and for a full commissioning of the system to be carried out in the factory prior to shipment. This relieves the customer of the need to carry out labor-intensive commissioning activities in-house, as a result of which the customer gains significant time and cost benefits.

Because the motor unit can already be tested at the factory, fewer quality issues are likely. The terminal box for a motor can also be dispensed with, since the wiring of the inverter can already be carried out in the cooler.

BRIEF DESCRIPTION OF THE DRAWING

The invention and embodiments of the invention are described and explained in more detail below with reference to the exemplary embodiments illustrated in the figures, in which:

FIG. 3 shows a third embodiment variant of a motor unit, visualizing the path taken by the cooling medium, FIG. 4 shows a fourth embodiment variant of a motor unit, wherein the heat exchanger has a blower fan.

DETAILED DESCRIPTION OF PREFERRED EMBODIMENTS

Equivalent components have been labeled with the same reference signs.

Figure 1:
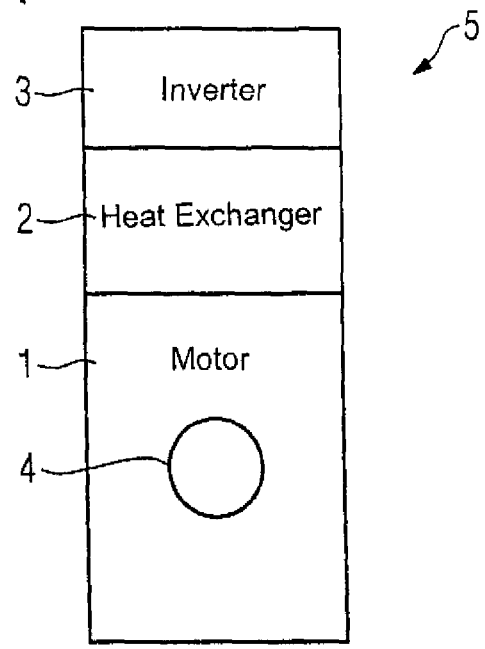
FIG. 1 shows a first embodiment variant of a schematically represented motor unit.

FIG. 1 shows a first embodiment variant of a schematically represented motor unit 5. It can be seen here that the heat exchanger 2 is arranged between the inverter 3 and the motor 1. In the present case the motor 1 has a motor shaft 4. Having the heat exchanger 2 arranged between the inverter 3 and the motor 1 means that both the inverter 3 and the motor 1 can be cooled with the aid of said heat exchanger 2. As a result an extremely compact design of the motor unit 5 can be realized. A further advantage is that because the motor unit 5 is produced at the factory the cabling between the inverter 3 and the motor 1 can already be completed prior to shipment. Furthermore, full commissioning of the motor unit 5 can already take place at the factory. Quality issues can consequently be avoided on the customer side.

Figure 2:
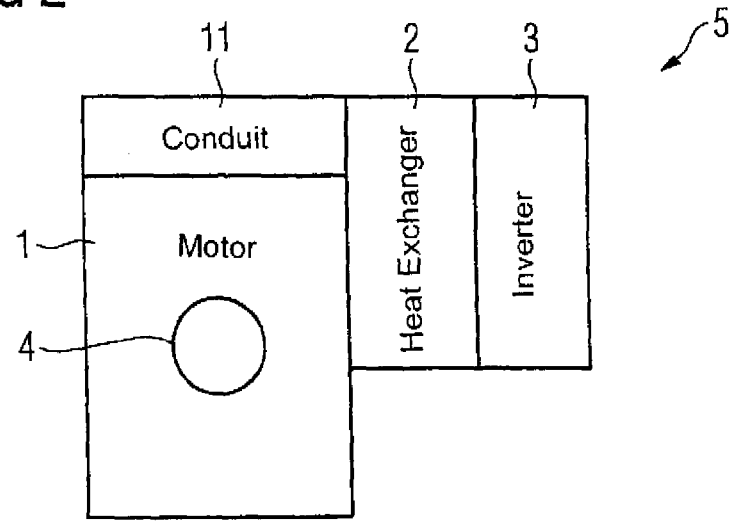
FIG. 2 shows a second embodiment variant of a schematically represented motor unit.

The heat exchanger 2 and the inverter 3 can be arranged in a flexible configuration; see FIG. 2 for example. FIG. 2 shows a second embodiment variant of a schematically represented motor unit 5. With this motor unit 5, the heat exchanger 2 and the inverter 3 are arranged at the side of the motor 1. A conduit 11 for a cooling medium enables the motor 1 also to be supplied with the cooling medium of the heat exchanger 2. The heat exchanger 2 can therefore provide cooling both for the inverter 3 and for the motor 1. Arranging the heat exchanger 2 and the inverter 3 at the side permits in particular special customer requirements, e.g. where confined space conditions apply, to be catered for.

FIG. 3 shows a third embodiment variant of a motor unit 5, visualizing the path taken by the cooling medium 12. In this case the motor unit 5 comprises a motor 1, the heat exchanger 2 and a housing 13 of the heat exchanger 2. The inverter 3 is also incorporated within the housing 13 of the heat exchanger 2. The housing 13 of the heat exchanger 2 is connected directly to the motor 1 and thermotechnically coupled thereto. The motor 1 has a motor shaft 4 and a rotor 14. The housing 13 of the heat exchanger 2 includes a first opening 7 and a second opening 8. The cooling medium 12, in this example the air, can enter the interior 10 of the heat exchanger 2 by way of the first opening 7. The cooling medium 12 flows firstly through the interior 10 of the heat exchanger 2, partly past the outside of the inverter 3, until it exits from the housing 13 of the heat exchanger 2 at the second opening 8. The cooling medium 12 can furthermore flow directly through the interior 15 of the inverter 3. In addition the cooling medium 12 can enter the interior 9 of the motor 1 by way of a further opening between the heat exchanger 2 and the housing of the motor 1. The cooling medium 12 flows through the region of the rotor 14 and consequently cools the rotor 14 as well as the other components of the motor 1. The heated cooling medium 12 emerges from the interior 9 of the motor and enters the interior 10 of the heat exchanger 2 through a further opening between the motor 1 and the housing 13 of the heat exchanger 2. The heated cooling medium 12 can now exit from the interior 10 of the heat exchanger 2 by way of the second opening 8.

The inverter 3 can have a plurality of inlets/outlets for the cooling medium 12, such that an optimal exchange of heat by means of the cooling medium 12 can take place between the inverter 3 and the heat exchanger 2.

In FIG. 3, some of the cooling medium 12 is conducted directly through the interior 10 of the heat exchanger 2 while another portion of the cooling medium 12 is conducted through the interior 15 of the inverter 3 to the second opening 8. In this case the second opening 8, which has a grid-like structure, extends as far as the outlets of the cooling medium 12 at the front face of the inverter 3. In particular the inverter 3 and the heat exchanger 2 per se are cooled by means of the cooling circuit through the inverter 3 and through the heat exchanger 2, while the inverter 3 and the motor 1 are also cooled by way of the heat exchanger 2. A portion of the cooling medium can also enter the interior 9 of the motor 1 and bring about an immediate cooling of the components of the motor 1, such as e.g. the stator or the rotor 14. By means of such an embodiment of the motor unit 5 it is therefore possible for both the motor 1 and the inverter 3 to be optimally cooled by means of one heat exchanger 2. With a motor unit 5 embodied in this way, optimal cooling of the inverter 3, the heat exchanger 2 and the motor 1 can be realized. With this arrangement it is merely necessary to ensure that the cooling medium 12 is caused to flow through the motor unit 5. Targeted control of the flow of the cooling medium 12 can be achieved for example by means of a blower fan.

An advantage of such an embodiment of the motor unit 5 is that the shaft blower fan of the motor 1 ensures a flow of the cooling medium 12 inside the motor 1 as well as between the first opening 7 and the second opening 8 of the heat exchanger 2. The cooling medium 12 is consequently conducted through the heat exchanger 2 so that a cooling of the inverter 3 and of the motor 1 can take place. A further advantage of said motor unit 5 consists in the integration of the inverter 3 into the housing 13 of the heat exchanger 2. As a result of the inverter 3 being integrated into the housing 13 it is already possible to complete the cabling between the inverter 3 and the motor 1 at the factory. The two components can be optimally coordinated with one another and in addition the proper functioning of said components and/or of the motor unit 5 can already be tested in the factory prior to shipment.

FIG. 4 shows a fourth embodiment variant of a motor unit 5, wherein the heat exchanger 2 has a blower fan 6. The circulation of the cooling medium 12 inside the heat exchanger 2 and consequently in the interior 10 of the heat exchanger 2 itself, in the interior 15 of the inverter 3 and in the interior 9 of the motor 1 can be controlled by way of said blower fan 6. The cooling medium 12, which in this example is the ambient air, is ingested by means of the blower fan 6 from the ambient air into the first opening 7. The cooling medium 12 consequently enters the housing 13 of the heat exchanger 2. In this process some of the cooling medium 12 firstly flows directly through the interior 15 of the inverter 3 to the second opening 8, which is arranged in accordance with the cooling medium outlets of the inverter 3. Secondly, another portion of the cooling medium 12 flows into the interior 10 of the heat exchanger 2 and in so doing flows partly directly to the second opening 8 of the heat exchanger 2 and partly into the interior 9 of the motor 1 by way of two openings located between the housing 13 of the heat exchanger 2 and the motor 1. Cooling of the rotor 14 or of the shaft 4 as well as of other components of the motor 1 can be realized by this means.

Optimal cooling of the motor unit 5 as a function of the utilization of the capacity of the motor 1 or of the inverter 3 can therefore be ensured with the aid of the blower fan 6. If there is a high level of utilization of the capacity of the motor 1 and consequently a heat increase inside the motor 1, the cooling effect by means of the cooling medium 12 for the motor 1 can be increased by adjusting the speed of the blower fan 6 to a higher setting.

An extremely compact motor unit 5 can be provided owing to the integration of the inverter 3 into the housing 13 of the heat exchanger 2 and the direct connection of the housing 13 of the heat exchanger 2 to the housing of the motor 1. Installation activities that would normally be necessary on the part of the end customer can be avoided by means of a preinstalled and parameterized motor unit 5 of said type. This represents an enormous lightening of the load for the end customer.

Figure 5:
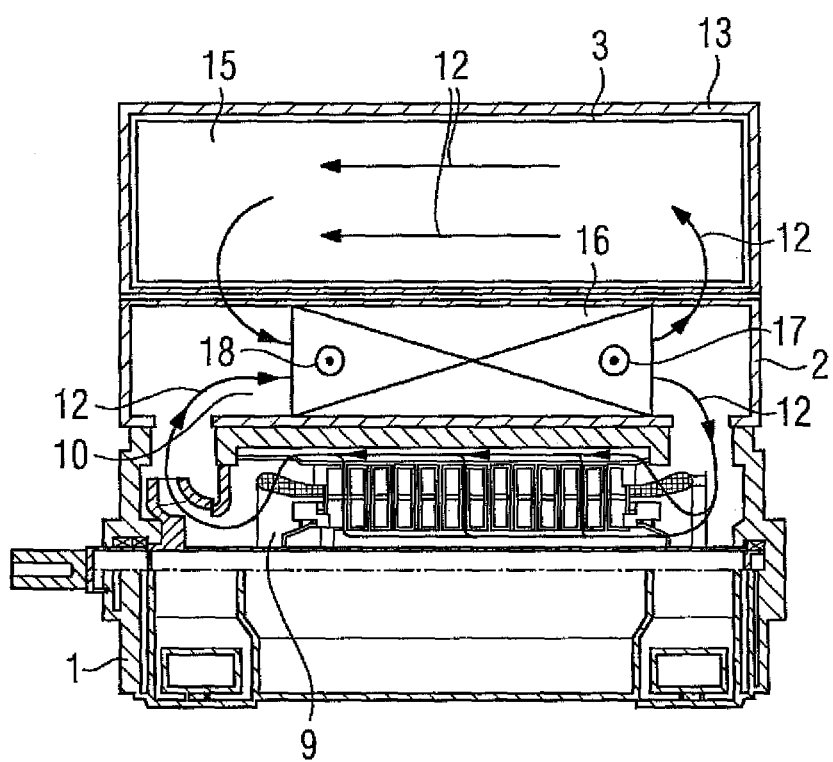
FIG. 5 shows a fifth embodiment variant of a motor unit, wherein the heat exchanger comprises an air-to-water heat exchanger.

FIG. 5 shows a fifth embodiment variant of a motor unit 5, wherein the heat exchanger 2 comprises an air-to-water heat exchanger 16. In this case the air-to-water heat exchanger 16 is arranged inside the heat exchanger 2 between the motor 1 and the inverter 3, such that it can cool these directly. The inverter 3 is arranged inside the housing 13 of the heat exchanger 2. The air-to-water heat exchanger 16 has a first opening 17 to allow an inflow of a liquid cooling medium, such as water for example. The air-to-water heat exchanger 16 also includes a second opening 18 to allow an outflow of the liquid cooling medium. In this case the cooling of the liquid cooling medium of the air-to-water heat exchanger 16 can be accomplished both outside the motor unit 5 and inside the motor unit 5, in particular inside the heat exchanger 2.

Extremely efficient cooling of the heat exchanger 2 and in particular of the adjacent motor 1 and inverter 3 is ensured by means of the air-to-water heat exchanger 16, thus enabling the motor unit 5 to be implemented in an extremely compact design. The cooling of the inverter 3 and the motor 1 by means of the air-to-water heat exchanger 16 primarily produces two cooling circuits, namely one cooling circuit for the interior 15 of the inverter 3 and one cooling circuit for the interior 9 of the motor 1. The respective cooling circuits are visualized by means of the arrows of the cooling medium 12. In this case the cooling medium 12 is the air. Equally, however, it is also conceivable for the respective cooling circuit of the motor 1 and of the inverter 3 to be realized by means of a water-cooled system. Said water-cooled system can be embodied either directly by means of the existing air-to-water heat exchanger 16 or be coupled to the latter.

In this case the housing 13 of the heat exchanger 2 can be embodied as open, i.e. air-permeable, or closed, i.e. air-impermeable. If the housing 13 of the heat exchanger 2 is embodied as open, cooling by means of air, as shown in the embodiment variant according to FIG. 3 or 4 for example, can be realized in addition. With a closed housing 13, on the other hand, safety can be increased.

A significant advantage of the use of the air-to-water heat exchanger 16 is that compared to the air-to-air heat exchangers it enables high cooling capacities to be realized while taking up very little space.

The invention claimed is:
1. A motor unit, comprising:
a motor;
an inverter for the motor;
a heat exchanger constructed for cooling both the motor and the inverter, said heat exchanger being arranged between the motor and the inverter and connected to the motor and the inverter, wherein the inverter is incorporated within a housing of the heat exchanger; and a cooling system to cool the motor unit with a gaseous cooling medium, wherein a first portion of the cooling medium is conducted directly through an interior of the heat exchanger, a second portion of the cooling medium is conducted through an interior of the motor by way of the heat exchanger, and a third portion of the cooling medium is conducted through an interior of the inverter, wherein the heat exchanger includes a first opening to allow an inflow of the cooling medium into the interior of the heat exchanger, and a second opening to allow an outflow of the cooling medium from the interior of the heat exchanger.

2. A motor unit, comprising:

a motor;

an inverter for the motor; and a heat exchanger constructed for cooling both the motor and the inverter, said heat exchanger being arranged between the motor and the inverter and connected to the motor and the inverter, wherein the inverter is incorporated within a housing of the heat exchanger;

wherein the heat exchanger comprises an air-to-water heat exchanger by way of which a first cooling circuit and a second cooling circuit are routed, wherein the first cooling circuit is routed through an interior of the inverter and the second cooling circuit is routed through an interior of the motor.

3. The motor unit of claim 2, wherein the heat exchanger includes a first opening to allow an inflow of a liquid cooling medium into an interior of the heat exchanger, and a second opening to allow an outflow of the liquid cooling medium from the interior of the heat exchanger.

4. The motor unit of claim 2, wherein the heat exchanger has a housing which is closed.

\* \* \* \* \*